J. SLEPIAN.
CIRCUIT INTERRUPTER.
APPLICATION FILED NOV. 4, 1918.

1,406,234.

Patented Feb. 14, 1922.

WITNESSES:
J. A. Helsel.
H. M. Biebel.

INVENTOR
Joseph Slepian.
BY
Wesley G. Carr
ATTORNEY

UNITED STATES PATENT OFFICE.

JOSEPH SLEPIAN, OF PITTSBURGH, PENNSYLVANIA, ASSIGNOR TO WESTINGHOUSE ELECTRIC & MANUFACTURING COMPANY, A CORPORATION OF PENNSYLVANIA.

CIRCUIT INTERRUPTER.

1,406,234.  Specification of Letters Patent.  Patented Feb. 14, 1922.

Application filed November 4, 1918. Serial No. 260,940.

*To all whom it may concern:*

Be it known that I, JOSEPH SLEPIAN, a citizen of the United States, and a resident of Pittsburgh, in the county of Allegheny and State of Pennsylvania, have invented a new and useful Improvement in Circuit Interrupters, of which the following is a specification.

My invention relates to circuit interrupters and particularly to means for reducing the arcing across the contact members to such devices.

The object of my invention is to provide means for so controlling an electrolytic cell that is connected in shunt relation with a circuit interrupter, that its capacity for absorbing energy may be made relatively much larger than its normal capacity.

When circuit interrupting devices are opened there is usually some arcing between the contact members, this arcing depending upon several factors, such as the material of which the contact members are made, the speed with which the circuit interrupter opens, the amount of current flowing in the circuit just previous to the interruption of the same and the amount of inductance in the circuit. If the circuit interrupter is opened frequently, the effect of such arcing may result in so pitting the contact surfaces that imperfect contact may obtain.

In practicing my invention, I provide an electrolytic cell that is normally connected in shunt relation to a circuit interrupter and means for so acting upon the electrolytic cell that it may absorb a relatively large amount of electrical energy, which energy is discharged at the time of interrupting the circuit.

Figure 1:
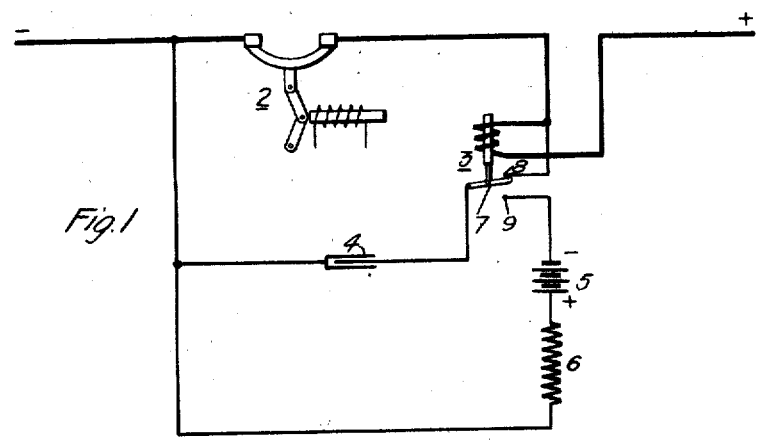
Figure 2:
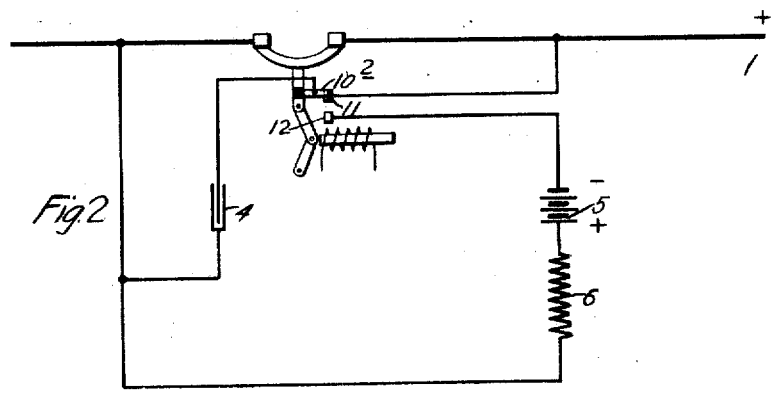

Figure 1 of the drawing is a diagrammatic view of an energy absorbing device for a circuit interrupter embodying my invention, and Figure 2 is a diagrammatic view of a modified form of energy-absorbing device embodying my invention.

In Fig. 1, a circuit interrupter 2 and the actuating coil of an electromagnetic switch 3 are connected in series with one conductor of a circuit 1. An electrolytic cell 4 is so connected to the circuit and the electromagnetic switch 3 that it will be in shunt relation to the circuit when the circuit interrupter is in its normal position. A source 5 of electromotive force is connected, as shown, through a suitable resistor 6, with the polarity relation as shown in Fig. 1. If the circuit interrupter 2 is caused to open, the electromagnetic switch 3 will operate, by reason of the de-energization of its coil, to cause the switch member 7 to be disengaged from contact terminal 8 and to engage the contact terminal 9. Thus, the cell 4 will be connected to the source 5 of electromotive force through the resistor 6.

The electrolytic cell 4 consists of a combination of one or more plates of a non-film-forming metal, such as copper, with one or more plates of a film-forming metal, such as aluminum and a suitable electrolyte, such as copper citrate. When the circuit interrupter is opened, the electrolytic cell 4 will carry the current for a relatively short period of time until a resisting film of such thickness is formed on the one set of plates as to prevent the flow of an appreciable amount of current through it. After the switch 3 operates, the source 5 of direct-current electromotive force, of about 12 volts, is to connected to the electrolytic cell 4 as to send a current through it in the reverse of the normal direction to cause the resistance film on the one set of plates to be destroyed. By using certain kinds of electrolytes, especially a solution of copper citrate, this reversal of current through the electrolytic cell 4, with consequent breakdown of the resistance film, increases enormously the amount of energy that the cell can take up in the next charge before the resistance film is again built up. The ability of the cell to absorb relatively large amounts of energy will enable the circuit interrupter to open a circuit carrying a relatively large current without appreciable sparking or arcing at the contact members.

Where the circuit interrupter opens many times during the day, as, for instance, in the case of a circuit interrupter controlling an elevator motor or a fluttering relay on a motor controller, this freedom from arcing will result in greater positiveness of action of the circuit interrupter and in a longer life of the contact member. The resistor 6 may be connected in the circuit comprising the source 5 of electromotive force so as to regulate the amount of current that flows through the cell in the reverse of normal direction. The electrolytic cell 4 may be made of suitable capacity, both as to current and voltage values, by varying the size and number of plates.

In Fig. 2, the circuit interrupter 2 is provided with an insulated auxiliary contact member 10 that is so mounted on the circuit interrupter mechanism as to be actuated thereby. One terminal of the electrolytic cell 4 is connected to the contact member 10, and, in the normal position of the circuit interrupter, said contact member engages a terminal 11 that is connected to the circuit 1 substantially as shown, whereby the electrolytic cell 4 is connected normally in shunt relation with the circuit interrupter. A terminal 12 is so mounted and connected that the contact arm 10 will engage the same when the circuit interrupter is in its open position, and the electrolytic cell 4 will then be connected in series with the source 5 of electromotive force, through the resistor 6. It is essential that the polarity of the circuit 1 and of the source 5 of electromotive force be as indicated in the drawing in order that the resistance film on the one set of plates in the electrolytic cell 4 shall be destroyed when the cell is connected to the source 5 of electromotive force, thus permitting the cell to be in condition to absorb the energy which is sent through it when the circuit interrupter opens.

If copper citrate is used as the electrolyte, the reversal of current through the cell increases enormously the amount of energy that may be taken up by it on the next charge before the resistance film is built up and thus the growth of the resistance film is delayed, giving the circuit interrupter more time to open without arcing across its contact members. The voltage of the source 5 of electromotive force is preferably 10 to 12 volts although this may vary with the size and number of plates in the electrolytic cell.

While I have shown two different means by which proper sequence of operations may be obtained, my invention is not limited to any specific structure or to the arrangements of circuits and means illustrated, and I desire that only such limitations shall be imposed as are indicated in the appended claims.

I claim as my invention:

1. The combination with a circuit-interrupting device and an electrolytic condenser, of means for connecting the electrolytic condenser in shunt with the circuit-interrupting device when said device is in a closed position and for so connecting said electrolytic condenser in circuit with a source of electromotive force as to break down its resistance, when the circuit-interrupting device is in its open position.

2. The combination with a circuit-interrupting device and an electrolytic condenser, of an electromagnetically operated switch for connecting the electrolytic condenser in shunt with the circuit-interrupting device when said device is in a closed position and for so connecting said electrolytic condenser in circuit with a source of electromotive force as to break down the resistance of said condenser, when the circuit-interrupting device is in its open position.

3. The combination with a circuit-interrupting device and an electrolytic condenser, of a source of electromotive force, and means for open-circuiting the source of electromotive force when the circuit-interrupting device is closed and for so connecting the source of electromotive force in circuit with the electrolytic condenser as to break down the resistance of said condenser, when the circuit-interrupting device is open.

4. The combination with a circuit-interrupting device and an electrolytic valve, of a source of electromotive force, and means for connecting the electrolytic valve in shunt with the circuit-interrupting device when same is in its normal position and for connecting the source of electromotive force in circuit with the electrolytic valve under abnormal conditions of operation as to break down the resistance of said electrolytic valve.

5. The combination with a circuit-interrupting device and an electrolytic valve in shunt therewith, of a source of electromotive force, and means for disconnecting said source of electromotive force from the electrolytic valve when the circuit-interrupting device is closed and for so connecting said source of electromotive force to the electrolytic valve as to break down its resistance after said circuit-interrupting device has opened.

6. The combination with a circuit-interrupting device and an electrolytic valve in shunt therewith, of a source of electromotive force, and an electromagnetically controlled switch for disconnecting said source of electromotive force from the electrolytic valve when the circuit-interrupting device is closed and for so connecting said source of electromotive force to the electrolytic valve as to break down the resistance of said electrolytic valve after said circuit-interrupting device has opened.

7. The combination with a circuit-interrupting device and a film-forming device for absorbing energy when the circuit-interrupting device is opened, of means for so breaking down the resistance of the film-forming device during the time that the circuit-interrupting device is open that the said film-forming device will absorb a relatively large amount of energy when the circuit-interrupting device is again opened.

8. The combination with a circuit-interrupting device and an electrolytic valve normally connected in shunt therewith, said electrolytic valve having as its electrolyte a solution of copper citrate, of a source of direct-current electromotive force, and means for disconnecting said electrolytic valve from its normal shunt relation to said circuit-interrupting device and connecting said source of electromotive force in circuit with said electrolytic valve to break down the resistance film.

In testimony whereof, I have hereunto subscribed my name this 29th day of Oct., 1918.

JOSEPH SLEPIAN.